(12) United States Patent
Yokota et al.

(10) Patent No.: US 7,597,732 B2
(45) Date of Patent: Oct. 6, 2009

(54) GAS-LIQUID SEPARATOR

(75) Inventors: Hiroshi Yokota, Hiroshima (JP); Fumio Nishi, Hiroshima (JP)

(73) Assignee: Kabushiki Kaisha Yokota Seisakusho, Hiroshima-Shi (JP)

( * ) Notice: Subject to any disclaimer, the term of this patent is extended or adjusted under 35 U.S.C. 154(b) by 638 days.

(21) Appl. No.: 10/539,747

(22) PCT Filed: Dec. 25, 2003

(86) PCT No.: PCT/JP03/16734

§ 371 (c)(1),
(2), (4) Date: Jun. 20, 2005

(87) PCT Pub. No.: WO2004/058380

PCT Pub. Date: Jul. 15, 2004

(65) Prior Publication Data

US 2006/0064954 A1 Mar. 30, 2006

(30) Foreign Application Priority Data

Dec. 26, 2002 (JP) ............................. 2002-377060

(51) Int. Cl.
*B01D 45/12* (2006.01)
(52) U.S. Cl. .......................................... 55/406; 95/270
(58) Field of Classification Search .................... 55/406; 95/242, 261, 270; 96/177, 178, 216, 214, 96/217
See application file for complete search history.

(56) References Cited

U.S. PATENT DOCUMENTS 5,182,031 A 1/1993 Lamort
5,711,789 A * 1/1998 Elonen et al. ................. 96/216
6,152,689 A * 11/2000 Yokota et al. ............... 415/56.1
6,585,493 B2 * 7/2003 Sutton ............................ 417/69
6,629,821 B1 * 10/2003 Yokota et al. ............. 417/199.1

FOREIGN PATENT DOCUMENTS

| GB | 2 369 071 A | 5/2002 |
| JP | 3-26305 | 2/1991 |
| WO | WO 98/04833 A1 | 2/1998 |
| WO | WO 01/02732 A1 | 1/2001 |

* cited by examiner

*Primary Examiner*—Duane Smith
*Assistant Examiner*—Sonji Turner
(74) *Attorney, Agent, or Firm*—Kratz, Quintos & Hanson, LLP

(57) ABSTRACT

The present invention provides a gas-liquid separator with enhanced performance and easy operation, enabling to perform gas-liquid separation such as advanced defoaming or degassing, and facilitating easy cleaning with CIP (Cleaning In Place) and COP (Cleaning Out Place) ability that meets sanitary specifications.

This gas-liquid separator for gas-liquid separation performed by centrifugal force of an impeller mounted on a shaft which rotates in a casing comprises: a discharge impeller part providing discharge force to the passing fluid formed on an axial end of the impeller; a discharge outlet of the casing disposed in a position opposite the discharge impeller part; the other axial end of the impeller being formed to slide on the inner wall of the casing; an exhaust outlet of the casing disposed in a position opposite the sliding impeller part; vacuum means connected to the exhaust outlet; and a suction inlet of the casing disposed in a position between the discharge outlet and the exhaust outlet.

20 Claims, 10 Drawing Sheets

PRIOR ART

PRIOR ART

GAS-LIQUID SEPARATOR

BACKGROUND OF THE INVENTION

1. Field of the Invention

The present invention relates to a gas-liquid separator that performs advanced gas-liquid separation such as defoaming or degassing, and is easy to clean or disassemble meeting sanitary specifications.

2. Description of the Prior Art

Generally known systems referred to as gas-liquid separators for defoaming and degassing include container type devices that are filled with liquid and then heated or decompressed, systems that employ a gas permeation membrane where only the gas can pass, and systems employing centrifugation.

Of the above systems, the heating and decompressing types are mainly for batch processing, and are inappropriate for continuous processing, and they have the further disadvantage of larger space requirements. In the permeation membrane type system, clogging of the membrane occurs easily as a result of particles or solids in the liquid, and this entails increased replacement costs.

In contrast, the centrifugation system is appropriate for continuous processing, having the advantage of no impediment from particles and solids. However, since the separation is performed only based on the mass difference between the gas and liquid, the liquid-gas separation performance may be outperformed by the suction power of the vacuum means if an enhanced power vacuum means is installed, which may cause liquid penetration into the vacuum means. Therefore the problem with the centrifugation system is how to achieve strong separation and removal of the gas only.

To solve the aforementioned problem, International Publication WO98/04833 (International Application PCT/JP97/00857 "A self-priming type centrifugal pump") is an invention which employs safety equipment in the form of a valve mechanism equipped between the pump-type gas-liquid separator and the vacuum means to prevent liquid penetration between the pump and the vacuum means during pump activation, operation, and deactivation. (This invention will be hereinafter called "Original Invention 1".)

As exemplified in FIG. 16, a main pump 51, a sub-pump 54, and vacuum means 57 are employed in the apparatus according to Original Invention 1; the main pump 51 and the sub-pump 54 are installed across a spacer 53; the central area of a main pump impeller 52 is in communication with a sub-pump suction inlet 54a via the central opening on the spacer 53; a sub-pump discharge outlet 54b is in communication with a main pump suction inlet 51a via a return passage 54c; the central area of a sub-pump impeller 55 is connected to the vacuum means 57 via an exhaust passage 54f. A slow operation valve 58 with delayed opening at pump activation, a quick operation valve 59, which closes immediately when the pump is stopped, and additional protection means (a liquid holding tank) 60 are serially inserted in the exhaust passage 54f. With the adoption of a fluid ring type vacuum pump to the vacuum means 57 in FIG. 16, the slow operation valve 58 opens after a certain period of time has passed due to a gradual increase of the inner pressure in a valve drive chamber 57w in accordance with the fluid pressure increase of the fluid ring type vacuum pump.

Original Invention 1 prevents liquid penetration between the pump and the vacuum means during pump activation, operation, and deactivation, and all operations are performed automatically. Therefore it is extremely practical and useful, however, the following problems still remain unsolved in some applications.

Firstly, there remains the problem of insufficient gas-liquid separation performance when the system is applied to advanced defoaming or degassing operations.

Systems referred to as promoting gas-liquid separation, especially the separation and discharge of dissolved gas in the liquid, include systems employing an orifice in the pumped liquid passage for decompressing or increasing the liquid temperature, however, the problem is how to completely capture the separated gas and separate it from the pumped liquid. For advanced defoaming and degassing performance, enhanced power vacuum means are required, however, this also implies that pumped liquid mixed with gas can be drawn easily into the vacuum means. Furthermore, in the apparatus of Original Invention 1, centrifugal force for gas-liquid separation is generally produced by the main pump impeller 52 rotation, however, because a powerful vortex and turbulent flow are produced at the same time, some gas cannot be separated centrifugally, which may bleed out to a main pump discharge outlet 51b and cause insufficient gas-liquid separation.

Secondly, in applications for treatment of food and ultra-pure liquid, there is the problem of insufficient cleanability, either when the cleaning system is CIP (Cleaning In Place) or COP (Cleaning Out of Place).

Normally, the apparatus used for the above purposes requires, as "sanitary specifications", not only a flat and smooth wetted surface, but also a structure in which easy CIP (Cleaning In Place: internal cleaning without disassembly), COP (Cleaning Out of Place: disassembled cleaning), and reassembly can be performed. However, the structure of Original Invention 1 is complicated due to multiple impellers 52 and 55, multiple chambers across the spacer 53, and many casing members, which means disassembly is difficult. CIP (Cleaning In Place) of wet areas without leaving any shadows is also difficult due to the complicated passages.

Of the aforementioned problems, International Publication WO01/02732 (International Application PCT/JP00/04508 "Pump apparatus") is an invention which focuses on solving the first problem, that is, increased gas-liquid separation performance. (This invention will be hereinafter called "Original Invention 2".)

As exemplified in FIG. 17, the structure of the apparatus according to Original Invention 2 includes a gas-liquid separator installed in the passage of a liquid-feed main pump 71; a gas-liquid separating impeller 73 which rotates by a motor 74 is installed in the gas-liquid separator container 72 provided with an inlet 72a and an outlet 72b; a cavity holder 75 is also installed, which holds the tail bottom of a tornado-shaped cavity s caused by the rotation, preventing it from extending and being suctioned by the main pump 71. Clearance t between the cavity holder 75 and the inner wall of the container 72 is narrowed to allow only the pumped liquid that is pressed against the inner wall of the container 72 by centrifugal force by rotation of the gas-liquid separating impeller 73 to pass through the channel area. An exhaust pipe 76 opens near the center of the tornado-shaped cavity s, to draw out the cavity gas by vacuum means 77 via the exhaust pipe 76 and exhaust passage r.

Also, protection means 78 is installed to the exhaust passage r which only passes the gas to the vacuum means 77, preventing the pumped liquid from passing if the pumped liquid is mixed into the exhaust gas. In addition, a gas return passage u and a boosting means 79 are also employed for special usage in remixing the exhausted gas into the pumped liquid after the liquid is sent by the main pump 71, returning the pumped liquid to its original condition.

In Original Invention 2, gas bubbles in the pumped liquid are forcibly separated by centrifugal force by the rotation of the gas-liquid separating impeller 73, apart from the main pump 71 impeller, and the cavity holder 75 prevents the tail bottom of the tornado-shaped cavity s from extending and passing through the main pump 71 side. Furthermore, since the rotating liquid pushed against the inner wall of the container 72 flows through clearance t by priority, there is little possibility of gas bubbles passing through from clearance t. Therefore, gas can be gathered effectively and drawn out by the vacuum means 77. Due to this, the aforementioned first problem, that is the gas-liquid separation performance, has been largely resolved.

For Original Invention 2, however, the aforementioned second problem, that is the insufficient cleanability of the system, has not been resolved in any way. There is, instead, renewed occurrence of shadows or bottlenecks which create cleaning problems such as on the back side of the cavity holder 75 or in the exhaust pipe 76 installation part due to the cavity holder 75 or clearance t employed to improve the gas-liquid separation performance. The system is not applicable to various kinds of liquids because there is the possibility of clogging due to the bottleneck if particles or masses are mixed in the liquid such as food material. And, furthermore, if the formed cavity becomes unstable, the mixing of pumped liquid cannot be prevented in the gas-liquid separator because the cavity is simply drawn into the exhaust pipe 76 opening, and therefore, subsequent problems such as the elimination of the mixed liquid require the separate installation of the protection means 78.

These problems are caused inevitably due to the structure of Original Invention 2, and from a technical perspective pose difficulty in solving. Foremost, if gas-liquid separation performance improvement is the main focus, the structural composition becomes complicated, with the trade-off being insufficient cleanability. Therefore, resolving the aforementioned two problems, that is "gas-liquid separation performance" and "ease of cleaning" at the same time seemed a difficult challenge.

An object of the present invention, in respect to the previously mentioned circumstances, is to provide a gas-liquid separator with enhanced performance and easy operation in a simple gas-liquid separation mechanism with safe and assured operation, enabling application of powerful vacuum means to perform gas-liquid separation such as advanced defoaming or degassing, facilitating easy cleaning with CIP (Cleaning In Place) and COP (Cleaning Out of Place) ability that meets sanitary specifications, and enabling application to various kinds of liquids.

SUMMARY OF THE INVENTION

To attain the above object, the gas-liquid separator according to the present invention for gas-liquid separation performed by centrifugal force of an impeller mounted on a shaft which rotates in a casing comprises: a discharge impeller part providing discharge force to the passing fluid formed on an axial end of the impeller; a discharge outlet of the casing disposed in a position opposite the discharge impeller part; the other axial end of the impeller being formed to slide on the inner wall of the casing; an exhaust outlet of the casing disposed in a position opposite the sliding impeller part; vacuum means connected to the exhaust outlet; and a suction inlet of the casing disposed in a position between the discharge outlet and the exhaust outlet.

In the present invention, a cleaning fluid inlet may be provided near the shaft sealing of the casing where the rotating shaft penetrates;

the inlet to the casing may be formed in a flow path that winds up inside the casing;

the impeller may be provided with a baffle member which prevents the direct penetration of liquid near the rotating shaft to the exhaust outlet;

the impeller may be provided with at least one cylindrical member coaxially attached to the impeller;

at least one of fluid throttle means, heating means, and accumulation means may be inserted in the passage of the suction inlet;

cavitation causing means may be inserted in the passage for gas-liquid separation;

protection means, which allows gas passage but prevents liquid passage, may be inserted in the exhaust passage from the exhaust outlet to the vacuum means; and at least a portion of the discharged fluid from the discharge outlet may be returned to the suction inlet.

Because of such constitution, the gas-liquid separator according to the present invention performs advanced gas-liquid separation using powerful vacuum means. Wet areas can be cleaned without leaving any shadows during CIP (Cleaning In Place), and easy COP (Cleaning Out of Place) and reassembly is also facilitated. The system is applicable to various kinds of liquids such as food products or chemicals.

DESCRIPTION OF THE PREFERRED EMBODIMENTS

Figure 1:
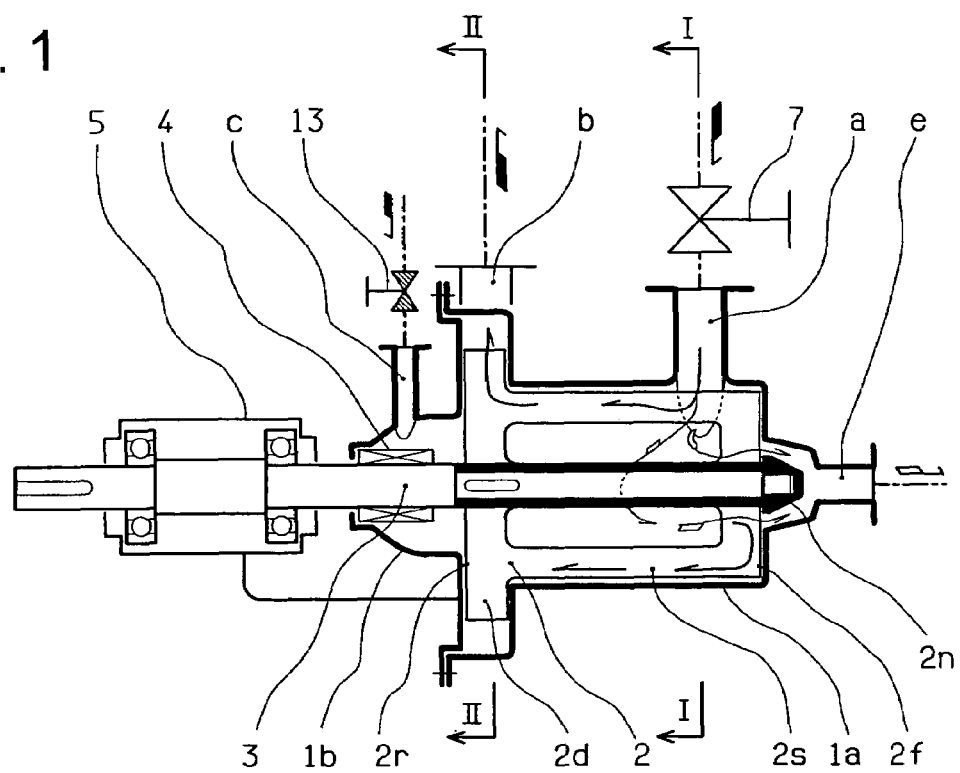
FIG. 1 is a vertical sectional view (partially a side view) of the first embodiment of the present invention.

Each embodiment of the present invention will be explained in detail using the same reference numerals that are common to each figure.

Figure 2:
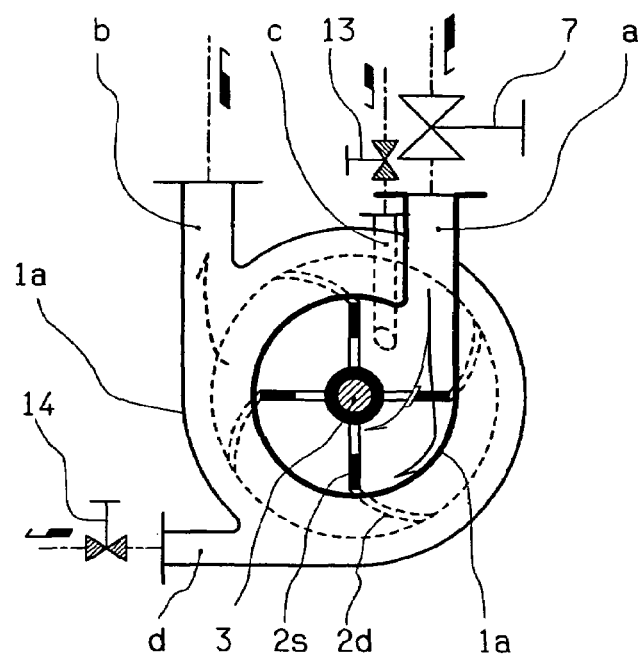
FIG. 2 is a sectional view along the line I-I in FIG. 1.
Figure 3:
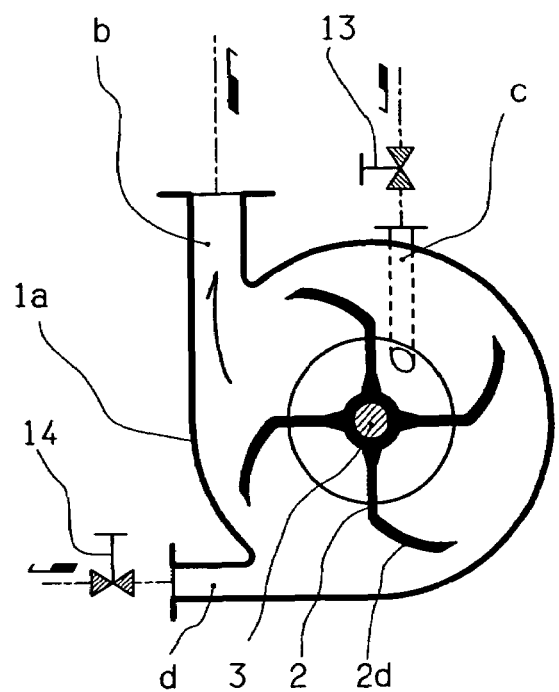
FIG. 3 is a sectional view along the line II-II in FIG. 1.

FIG. 1 shows the first embodiment of the present invention, FIG. 2 shows cross-section I-I in FIG. 1, and FIG. 3 shows cross-section II-II in FIG. 1.

A casing can be separated into 1a and 1b which form one cylindrical chamber when connected, and an impeller 2 with a suitable number of vanes is disposed in the casing 1a and 1b. The impeller 2, with an outer diameter that allows for a small clearance with respect to the inner wall of the casing 1a, is mounted to a rotating shaft 3. Although it may be mounted by screwing, it is mounted with an impeller nut 2n as illustrated in this embodiment. The rotating shaft 3 is supported by a shaft bearing 5, and penetrates the casing 1b with tight sealing at a shaft sealing 4, and a motor, not shown in the figure, drives the rotation.

The impeller 2 is provided with a separation impeller part 2s which performs gas-liquid separation in all areas around the rotating peripheral area, and the diameter near the one axial end (the left end in FIG. 1) 2r is expanded to form a discharge impeller part 2d so as to provide discharge power (discharge pressure) to the pumping liquid. Also, a discharge outlet b is formed in the casing 1a at a position opposite the discharge impeller part 2d.

At the same time, the other axial end (the right end in FIG. 1) 2f of the impeller 2 is formed to slide, while keeping the least predetermined clearance, with the inner wall of the casing 1a. Also, an exhaust outlet e is formed near the center of the casing 1a opposite the sliding impeller part for discharging the cavity gas generated from the gas-liquid separation, and the exhaust outlet e is connected to vacuum means which is not shown in the figure.

A suction inlet a is formed in the casing 1a at a position between the discharge outlet b and the exhaust outlet e, preferably at a position closer to the exhaust outlet e than the discharge outlet b.

Sufficient interior cavity space is provided near the shaft sealing 4 of the casing 1b where the rotating shaft 3 penetrates the casing, and a cleaning fluid inlet c is provided in the casing 1b at a position near the shaft sealing 4 so that the area can be cleaned internally without disassembling.

For the suction inlet a and cleaning fluid inlet c, which provide fluid flow into the casing, the inflow angle may be suitably selected, but it is of course more preferable for gas-liquid separation efficiency that the flow path of the suction inlet a is arranged to be drawn in from periphery of the casing 1a towards the center along the rotation direction of the impeller 2. The figure shows the flow path of the suction inlet a winding tangentially into the casing 1a. The flow path of the cleaning fluid inlet c is also drawn in tangentially from periphery of the casing 1b towards the center so that the cleaning fluid spreads into every corner while being whirled in the casing 1b.

Throttle means 7, which decompresses the pumped liquid, is inserted in the passage of the suction inlet a. It is known that gas dissolved in liquid can be separated to form bubbles when decompressed by flow restriction. In this embodiment, gas bubbles separated from the pumped liquid by decompression using the throttle means 7 are forced into centrifugal separation for improved gas-liquid separation performance.

The vacuum means may be a fluid ring type vacuum pump, other type of vacuum pump, or negative-pressure causing means.

When this apparatus is installed to the pipeline and operated, the pumped liquid is fed from the suction inlet a to the discharge outlet b by the pump action of the discharge impeller part 2d. Gas bubbles in the pumped liquid are forced into centrifugal separation by the rotation of the separation impeller part 2s, and the liquid flows towards the discharge outlet b while forming a thin layer on the inner wall of the casing 1a. At the same time, the gas gathers near the center of the impeller 2 to form a cavity. The cavity gas is drawn out by the vacuum means from the exhaust outlet e disposed near the center of rotation.

The process of this gas-liquid separation is based on the powerful centrifugal force generated by the separation impeller part 2s formed in wide area of rotating periphery of the impeller 2, which forces the pumped liquid to rotate, therefore good cavity is obtained with remarkably less mixture of liquid compared with a simple cyclonic type system, and powerful gas-liquid separation is carried out.

By setting the impeller diameter and rotation speed so that the centrifugal force of the separation impeller part 2s near the axial end 2f is stronger than the suction force of the vacuum means, the mixed liquid cannot approach the exhaust outlet e even if the pumped liquid is mixed into the gas flowing toward the exhaust outlet e, because the liquid with mass larger than the gas is flung by the centrifugal force of the separation impeller part 2s, and there is no pressure pressing the flung liquid back to the center. In addition, because the sliding clearance with the casing 1a on the axial end 2f is small, the liquid cannot penetrate from this area either. Therefore, the pumped liquid does not flow into the vacuum means during operation, the vacuum means is safe, and enhanced gas-liquid separation can be performed using the powerful vacuum means. According to the above structure, this apparatus can also be used as a pump providing high performance self-priming.

The exhaust outlet e does not need to be on the center line of the rotating shaft 3 and it may deviate from the rotating shaft center, however, an appropriate position between the center and the inner wall of the casing 1a should be selected because liquid pushed against the inner wall of the casing 1a will penetrate the exhaust outlet e if the exhaust outlet e is too far from the rotating shaft center. If the exhaust outlet e is on the rotating shaft center as in this embodiment, centrifugal force is still applied by the rotation because the gas passage is away from the rotating shaft center by at least the shaft diameter. As exemplified in the figure, the impeller nut 2n may be larger than the shaft diameter to prevent penetration of fluid near the rotating shaft 3 directly into the exhaust outlet e and to allow gas to pass the area with more powerful centrifugal force.

CIP (Cleaning In Place) of this apparatus can be easily performed, and performed in every corner, because the casings 1a and 1b form only one integrated chamber without any partition or bottleneck. More specifically, internal cleaning on the casing 1a side can be performed by pouring cleaning fluid from the suction inlet a and discharging it from the discharge outlet b, the exhaust outlet e, and the drain d while the apparatus is in operation. Internal cleaning on the casing 1b side can be performed by pouring the cleaning fluid from the cleaning fluid inlet c and discharging it from the discharge outlet b and the drain d. In these ways, wet areas can be cleaned without leaving any shadows. The operation is easier if valves 13 and 14 installed to the cleaning fluid inlet c and the drain d respectively are closed except during cleaning.

Also, in performing COP (Cleaning Out of Place) on this apparatus, cleaning of wet areas on the casing 1a side without leaving any shadows is possible because the casing can be easily separated into 1a and 1b parts without hang ups, and the impeller 2 can be exposed completely after the separation. In addition, cleaning of wet areas on the casing 1b side and reassembly is easy because the impeller 2 is an integrated unit which can be pulled out from the rotating shaft 3 without being disturbed by other components. For the casing installation, the 1b side may be fixed while the remaining 1a side is removed, or the 1a side may be fixed while the remaining 1b side including the rotation body can be removed (so called back pullout type design).

This apparatus can be applied in a wide variety of areas including defoaming, antifoaming, or deaeration of food material, oil, or chemicals, production of pure water, ultra pure liquid, deoxygenated water for rust prevention, and other degassed water. This can also be used for mixing the desired gas (such as ozone) after degassing. The overall advantage of this apparatus is that it is operated mechanically without using any chemical additives.

Figure 4:
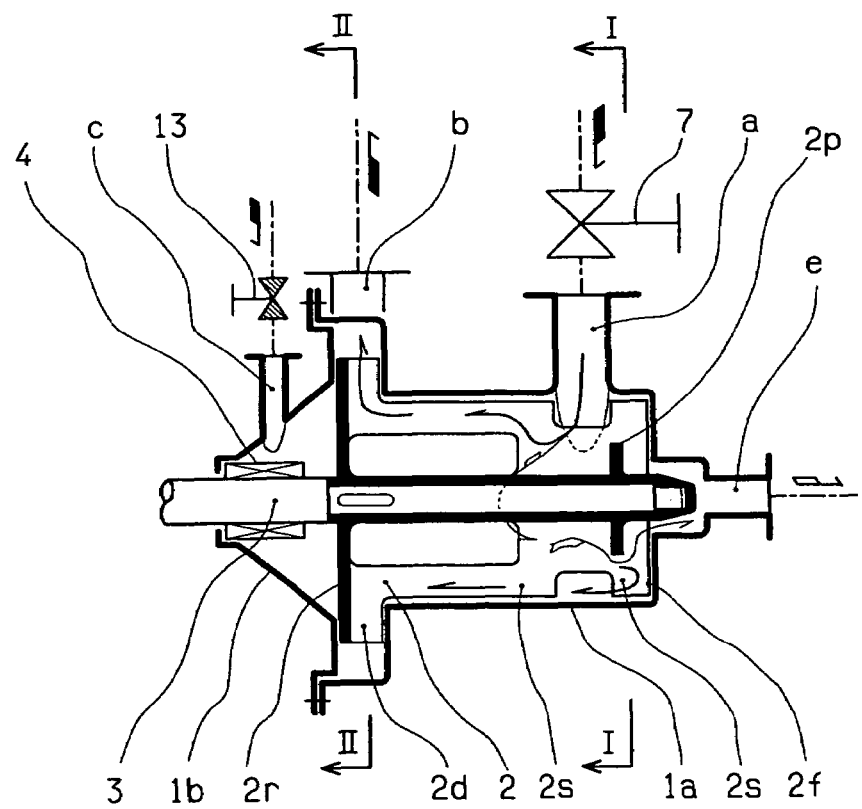
FIG. 4 is a vertical sectional view (partially a side view) of the second embodiment of the present invention.
Figure 5:
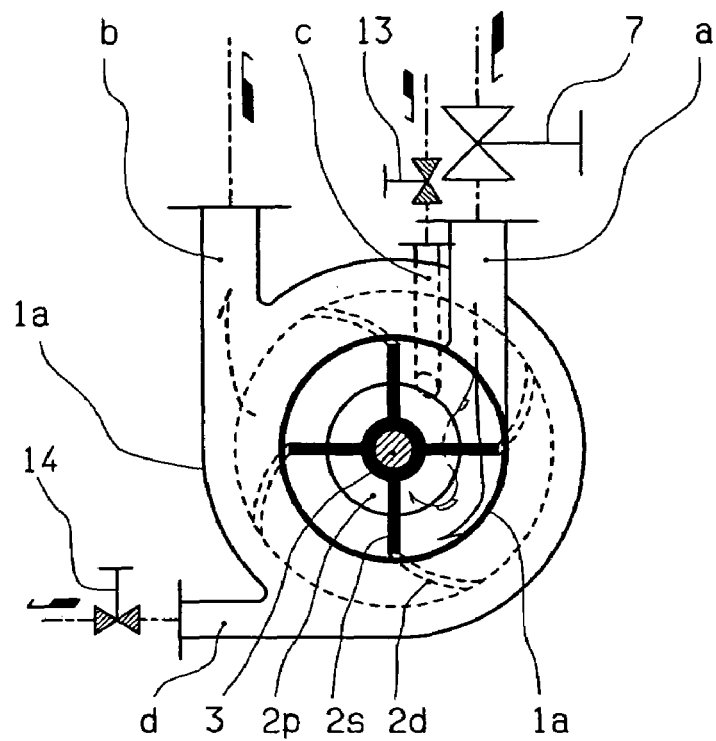
FIG. 5 is a sectional view along the line I-I in FIG. 4.
Figure 6:
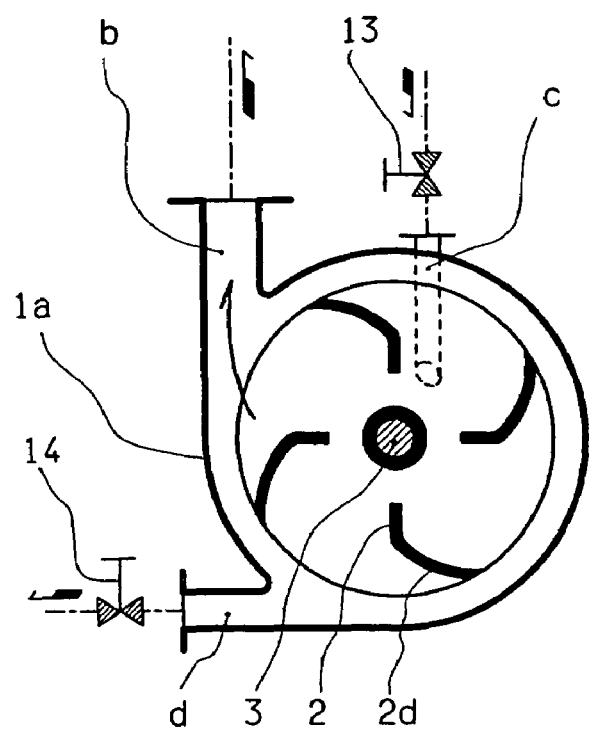
FIG. 6 is a sectional view along the line II-II in FIG. 4.

FIG. 4 illustrates the second embodiment, FIG. 5 illustrates section I-I in FIG. 4, FIG. 6 illustrates section II-II in FIG. 4. In this embodiment, in regard to the impeller 2 of the apparatus in the first embodiment, a baffle member 2p (the plate member in this embodiment), which prevents liquid near the rotating shaft 3 from directly penetrating into the exhaust outlet e, is provided in the impeller 2 at a position near the exhaust outlet e. Due to this, even if pumped liquid is mixed into the cavity gas near the center of rotation, the liquid portion is flung and rebounded by the baffle member 2p and prevented from penetration into the exhaust outlet e. Therefore, the vacuum means is even safer and it can suction gas only with strong force. The size of the baffle member 2p is determined by considering the required centrifugal force size (rotation speed) and the pumped liquid flow rate.

The shape of the cavity near the shaft sealing 4 through the cleaning fluid inlet c can be shaped such that the cleaning fluid does not readily accumulate, and, in this embodiment, a cone shaped type is illustrated as an example. If the cleaning fluid inlet c is disposed near the reduced diameter area of the cavity, added cleaning fluid discharges completely from the reduced diameter area to the drain at the bottom of the casing 1a via the expanded diameter area. If the cleaning fluid inlet c is structured so that the passage winds tangentially to the cavity, the cleaning fluid is discharged after cleaning the entire inside of the cavity evenly, further improving the cleaning effect.

The separation impeller part 2s is illustrated with a notch on the opposite area of the suction inlet a, as an example, so that it does not interfere with the pumped liquid inflow. Also, the discharge impeller part 2d with a shroud that increases discharging pressure is illustrated.

The rest of the constitution and functions are the same as those of the first embodiment.

Figure 7:
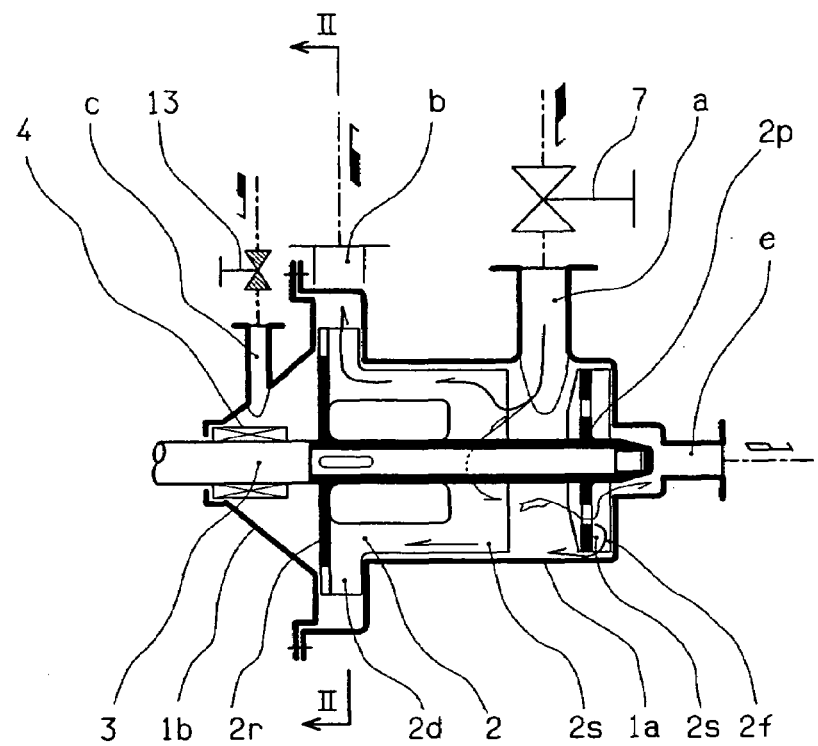
FIG. 7 is a vertical sectional view (partially a side view) of the third embodiment of the present invention.
Figure 8:
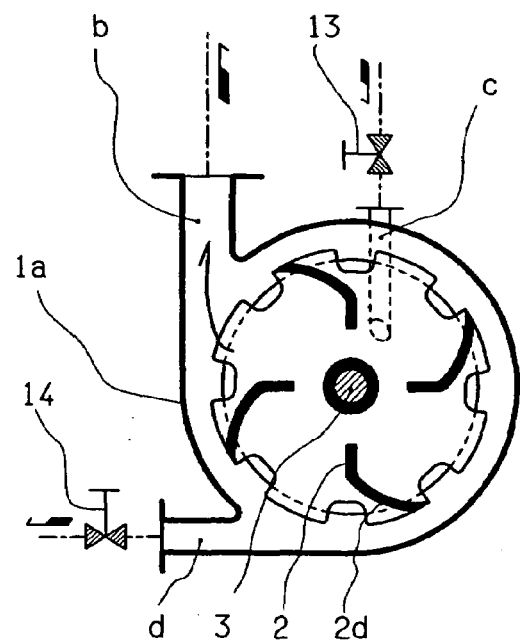
FIG. 8 is a sectional view along the line II-II in FIG. 7.

FIG. 7 illustrates the third embodiment and FIG. 8 illustrates section II-II in FIG. 7. In this embodiment, in regard to the separation impeller part 2s of the apparatus in the second embodiment, a notch on the area opposite the suction inlet a is further enlarged and nearly all the area opposite the suction inlet a is removed. In this case, the impeller 2 is still integrated providing a common boss so that it can be pulled out from the rotating shaft 3 easily for an enhanced cleaning effect. And the pumped liquid can flow into the casing 1a through the suction inlet a without meeting much resistance for improved process flow rate performance.

The baffle member 2p on the impeller 2, as exemplified in the figure, is expanded in diameter and formed as a shroud to increase the strength, with the front and back sides communicating with each other by a suitable number of holes or slits. Also, it is illustrated that, even if the discharge impeller part 2d has a shroud, the cleaning fluid poured from the cleaning fluid inlet c during CIP (Cleaning In Place) can still flow towards the drain d without accumulation by the configuration of a suitable shape and number of notches on the periphery of the shroud, by which the front and back sides of the shroud are in communication with each other.

The rest of the constitution and functions are the same as those of the second embodiment.

Figure 9:
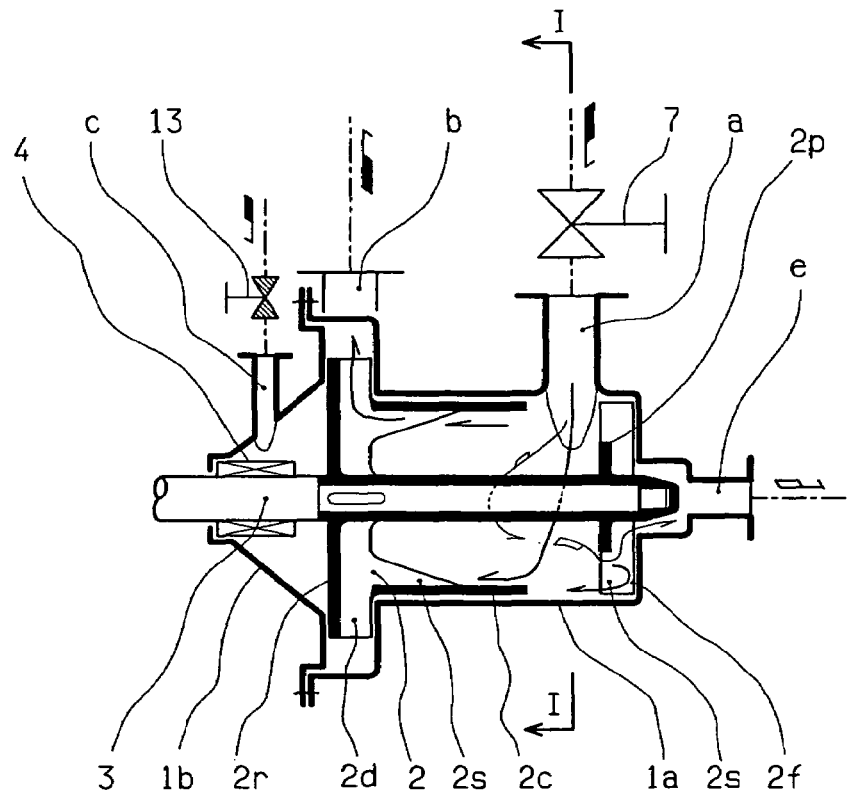
FIG. 9 is a vertical sectional view (partially a side view) of the fourth embodiment of the present invention.
Figure 10:
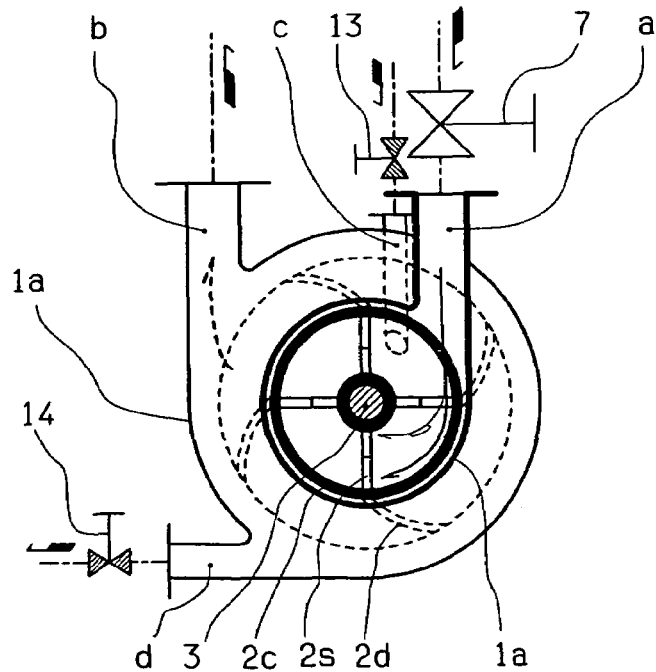
FIG. 10 is a sectional view along the line I-I in FIG. 9.

FIG. 9 illustrates the fourth embodiment and FIG. 10 illustrates section I-I in FIG. 9. In this embodiment, in regard to the impeller 2 in the apparatus of the third embodiment, a cylindrical member 2c, coaxial with the impeller 2, is attached to the impeller 2 at a position opposite the area between the suction inlet a and the discharge outlet b of the casing 1a.

Due to this structure, the pumped liquid flowing in from the suction inlet a is pushed against the inner wall of the rotating cylindrical member 2c and the rotation force is given from the inner wall simultaneously by flow resistance to separate the gas by centrifugal force, and it is then pushed out of the discharge outlet b by the discharge impeller part 2d. In other words, gas-liquid separation is performed moderately without excessive agitation, fracturing, or shear by friction with the edge of the impeller 2 or the inner periphery of the casing 1a. In gas-liquid separation for liquids such as food material, liquid containing grains, and bubble solutions, excess foaming due to excessive agitation of the pumped liquid and the destruction of particles due to excessive fracture and shear is undesirable in some cases, however, moderate gas-liquid separation is made possible by using the apparatus in this embodiment, which is quite favorable to the application of the various kinds of liquids.

A convex area, rib, and vanes may be provided inside the cylindrical member 2c for promoting forced rotation of the pumped liquid. For example, the separation impeller part also functions to support the cylindrical member 2c in the figure, however, forced rotation of the liquid is highly facilitated and centrifugal force for gas-liquid separation is enhanced by extending this supporting part 2s so that the impeller vanes are structured all over the inside of the cylindrical member 2c. The impeller vane height may also be selected suitably.

The rest of the constitution and functions are the same as those of the third embodiment.

Figure 11:
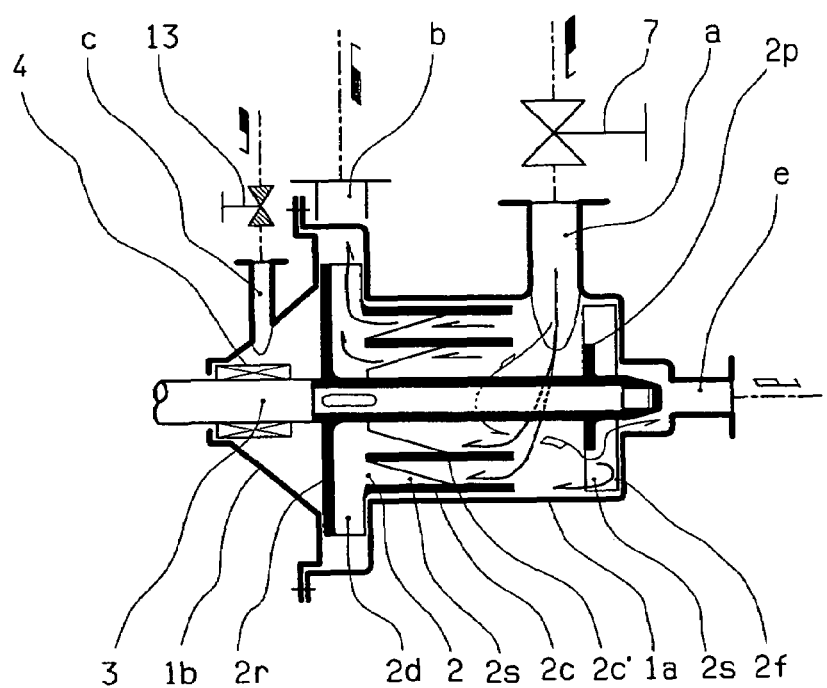
FIG. 11 is a vertical sectional view (partially a side view) of the fifth embodiment of the present invention.

The fifth embodiment in FIG. 11 shows the cylindrical member 2c of the fourth embodiment installed in multiple rows. Due to this, gas can be suctioned more effectively by increasing the boundary area (the surface area on which the liquid is exposed to the negative pressure of the vacuum means) of the liquid and the gas for gas-liquid separation. The cylindrical members are shown in two rows (2c and 2c'), however, the number of rows may be increased. A means of increasing the boundary area (processing or attaching material for porosity and roughness) may also be devised on these cylindrical members.

The rest of the constitution and functions are the same as those of the fourth embodiment.

Figure 12:
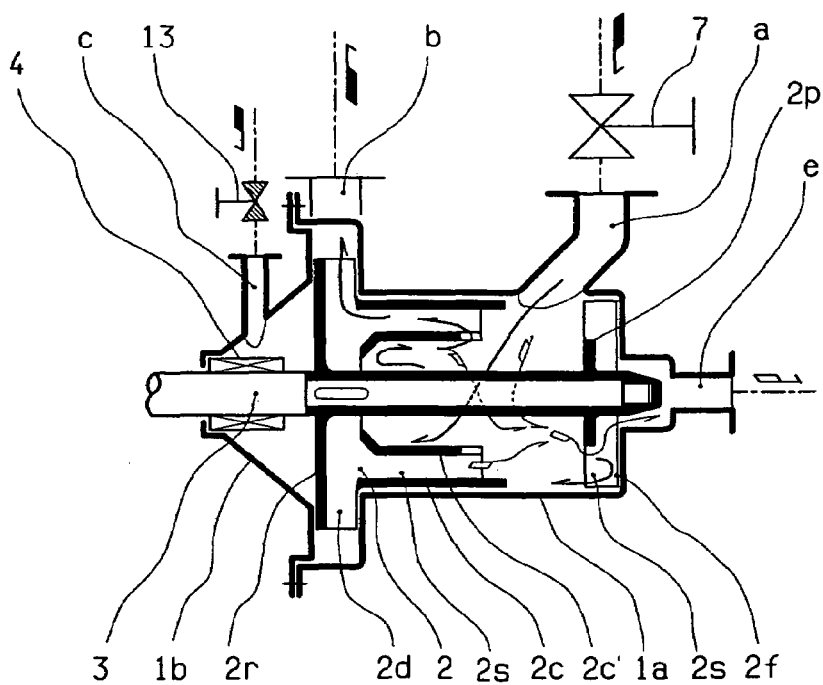
FIG. 12 is a vertical sectional view (partially a side view) of the sixth embodiment of the present invention.

The sixth embodiment in FIG. 12 shows the cylindrical member in the fifth embodiment deformed so that the pumped liquid is primarily pushed against the inner wall of the cylindrical member 2c' in a layer by centrifugal force and temporarily accumulated for gas-liquid separation, it then overflows to the outside for further gas-liquid separation in the multi-stage process. Therefore, the shape of the suction inlet a should also be set so that the flowing pumped liquid can be radiated towards the inside of the cylindrical member 2c'. Due to this multi-row process, the pumped liquid accumulates longer, further improving the gas-liquid separation performance. Another cylindrical member 2c is disposed outside of the cylindrical member 2c' as illustrated, however, the separation impeller part 2s without the cylindrical member may be provided instead. The cylindrical member may be disposed in the nested structure with increased rows as the number of rows is not restricted to only two. A dam of specified height is structured in the cylindrical member 2c' inwardly to temporarily accumulate the pumped liquid as illustrated. The clearance between the dam and the boss of the impeller is in consideration of performing cleaning around the member 2c' without leaving any shadows, however, it can be eliminated according to the application.

The rest of the constitution and functions are the same as those of the fifth embodiment.

Figure 13:
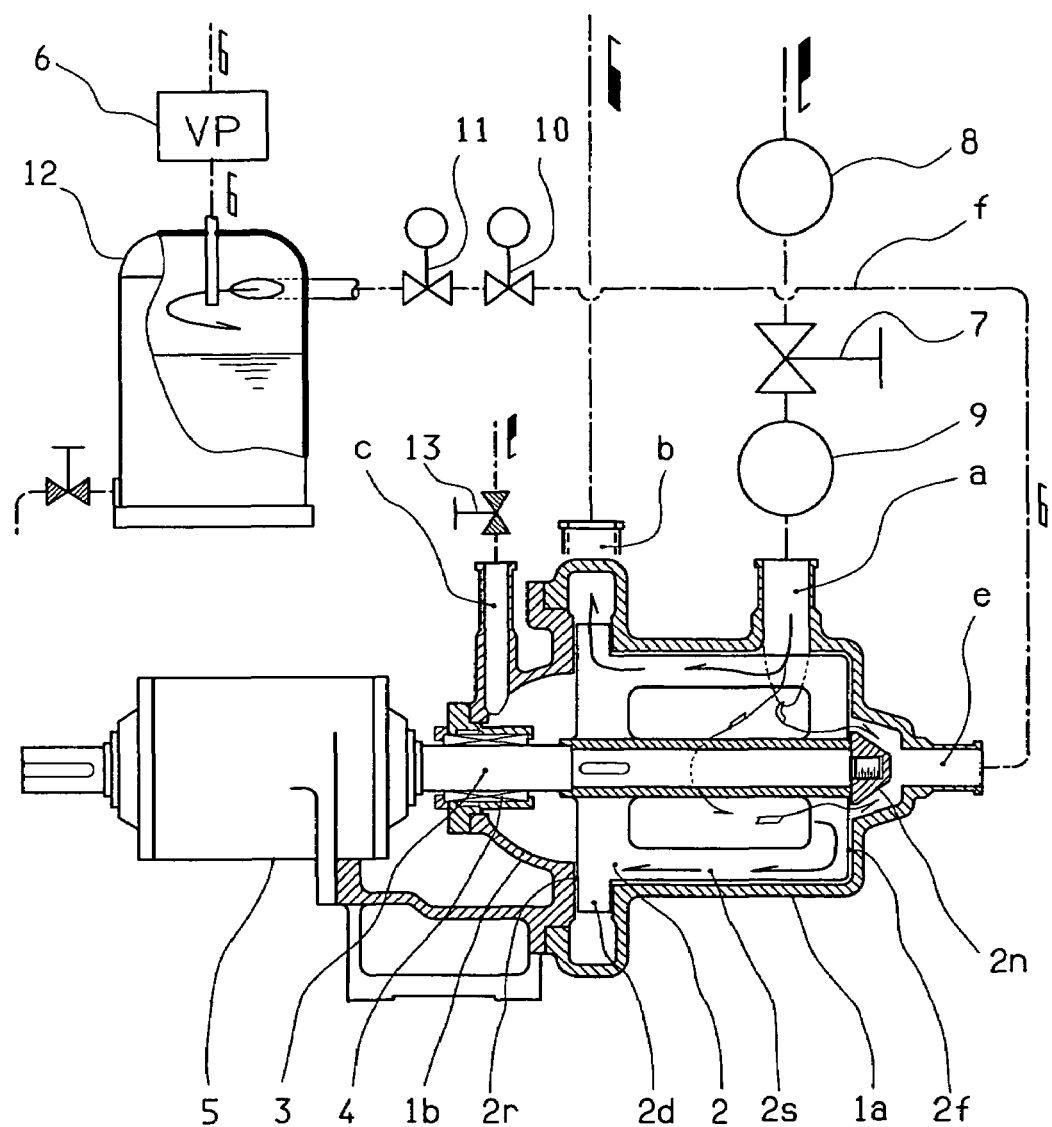
FIG. 13 is a vertical sectional view (partially a side view) of the seventh embodiment of the present invention.

The seventh embodiment in FIG. 13 shows the apparatus in the first embodiment more specifically.

This embodiment exemplifies that heating means 8 may be inserted in the passage of the suction inlet a because increasing the pumped liquid temperature helps the improvement of the gas-liquid separation efficiency. The heating means 8 may be suitably of heater type or heat-exchanger type.

In addition, the figure shows that cavitation causing means 9 may be inserted in a suitable position on the pumped liquid passage. Generating suitable degree of cavitation increases the gas-liquid separation efficiency by promoting the separation of dissolved gas in the liquid, and utilizing the impact of cavitation foams collapse, various effects can be expected, such as removal of foreign material stuck inside the apparatus, mold reduction, deodorization, atomization of particle inclusion, destruction of mixed-impurities, and water cluster dissolution. The cavitation causing means may be suitably selected, such as an ultrasonic wave generating type or a rotating propeller type. The cavitation causing means 9 may be disposed behind the discharge outlet b especially when applied to mold reduction.

Besides installing the cavitation causing means 9, the shape of the impeller 2 itself may be selected so that cavitation is promoted easily (impeller shape which can cause pressure fluctuation through vortex and turbulent flow such as the tabular, wedge-shaped, or convexo-concave shape).

For the apparatus of the present invention, because penetration of the pumped liquid into the exhaust passage f from the exhaust outlet e to the vacuum means 6 is adequately prevented by the separation impeller part 2s and the baffle member on the impeller 2, the exhaust passage f may be connected directly to the vacuum means 6 with virtually no problems, it is more preferable, however, to provide protection means which prevents the passing of the pumped liquid in the event the pumped liquid is mixed into the exhaust passage f. Protection means 10, 11, and 12, which allow gas passage, but prevent liquid passage are installed to the exhaust passage f in this embodiment as an example.

A slow operation valve 10 with delayed opening based on the pump activation, and a quick operation valve 11 which closes immediately when the pump is stopped are serially inserted in the exhaust passage f. The delayed valve opening operation of the slow operation valve 10 prevents pumped liquid from being suctioned by the vacuum means 6 upon the activation of this apparatus, and the quick valve closing operation of the quick operation valve 11 prevents the pumped liquid from being suctioned by the vacuum means 6, or prevents the operation fluid on the vacuum means 6 side being suctioned by the apparatus when the apparatus is turned off. In this figure, the slow operation valve 10 and the quick operation valve 11 which are electronically controlled for the opening/closing timing (illustration of the control system is abbreviated) are illustrated for ease of explanation. The slow operation valve 10 and the quick operation valve 11 may be combined in one valve which is controlled to perform delayed valve opening and immediate valve closing.

And a liquid holding tank 12 is installed to exhaust passage f as another protection means. The liquid holding tank 12, as illustrated, is provided with the inlet and outlet at the top of the tank so that the pumped liquid that has penetrated via the exhaust passage f accumulates at the bottom of the tank and only the gas can pass. The passage at the inlet is tangential to the tank inner wall to produce centrifugation effect, especially for gas-liquid separation performance improvement. A drain is provided at the bottom of the tank for discharging the accumulated liquid which can be suitably discharged by hand or automatically.

Additional protection means, such as a float valve which closes the exhaust passage f forcibly when the liquid surface of the exhaust passage f rises, may be installed to the exhaust passage f. Due to these protection mechanisms, the passage of the pumped liquid through the exhaust passage f can be prevented if the pumped liquid penetrates the exhaust passage f, ensuring the apparatus's safety. These protection mechanisms may be provided for their respective effective functions, and need not all be provided.

The rest of the constitution and functions are the same as those of the first embodiment.

In addition, it is obvious that each of the above installed mechanisms is applicable to all the aforementioned embodiments as well as this embodiment.

Figure 14:
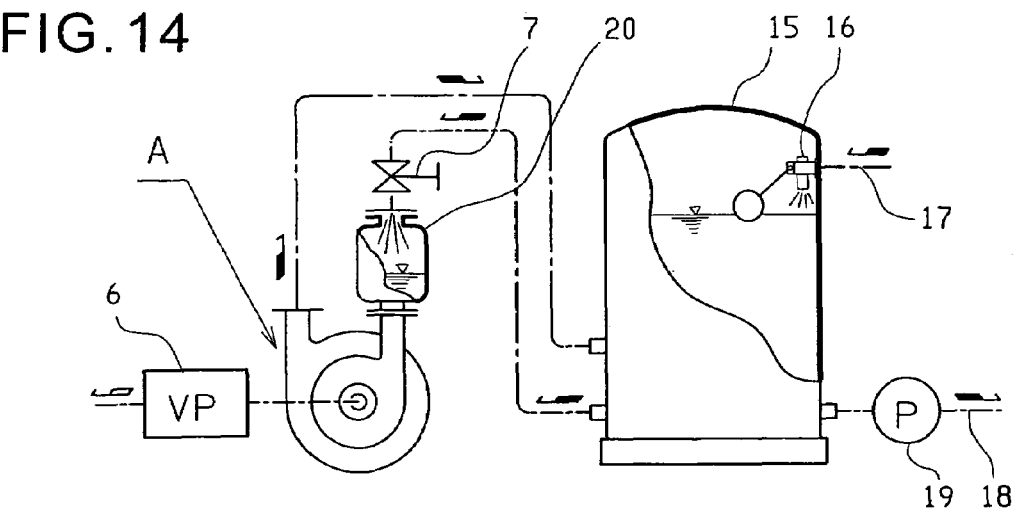
FIG. 14 is an explanation drawing (partially a sectional view) of the eighth embodiment of the present invention.

The eighth embodiment in FIG. 14 shows an example of a degassing system with the built-in gas-liquid separator A according to the present invention.

In this embodiment, discharged liquid from the discharge outlet on the gas-liquid separator A returns to the suction inlet via a storage tank 15. This method is useful solution in the event that gas-liquid separation performance is insufficient after one cycle of separation, especially during the advanced degassing process, and provides the specified degassing performance by circulating the processing liquid to repeat the gas-liquid separation. This circulation can be returned to the suction inlet directly from the discharge outlet without going through the storage tank 15, however, the circulation returns via the storage tank 15 in this embodiment for easy flow rate control.

The level of the liquid flowing from an inlet piping 17 into the storage tank 15 is controlled at nearly a constant level by a float valve 16 shown in the figure or a control valve, not shown in the figure. The liquid in the storage tank 15 is returned to the storage tank 15 again through the gas-liquid separator A and mixed with the liquid newly flowing from the inlet piping 17 to reduce the overall gas inclusion amount in the storage tank 15. The degassed liquid stored in the storage tank 15 is pumped from an outlet piping 18 to the point of use by a booster pump 19. Furthermore, an additional storage tank and the mechanism or equipment for automatic control of flow rate, pressure or temperature may be suitably installed.

Also, this figure illustrates that liquid accumulation means 20 may be installed to the decompressed passage from a throttle means 7 to the suction inlet of the gas-liquid separator A. This is one supplementary means for increasing the boundary area to improve degassing efficiency when the gas-liquid separator A is compact and the boundary area of the liquid and gas for gas-liquid separation is small. A suitable spray shape may be formed on the container inlet of the accumulation means 20, and porous or rough material may be provided inside the container to further increase the boundary area.

Figure 15:
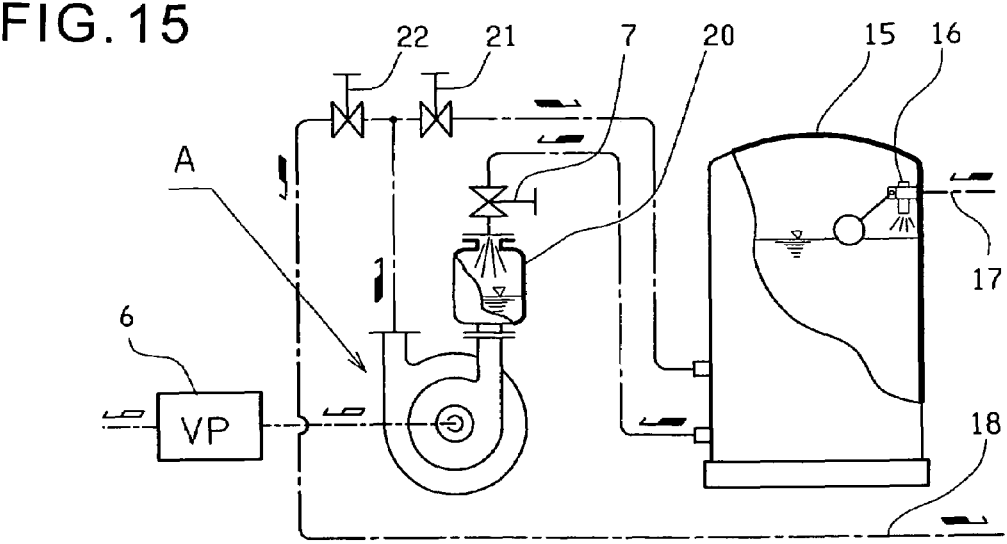
FIG. 15 is an explanation drawing (partially a sectional view) of the ninth embodiment of the present invention.
Figure 16:
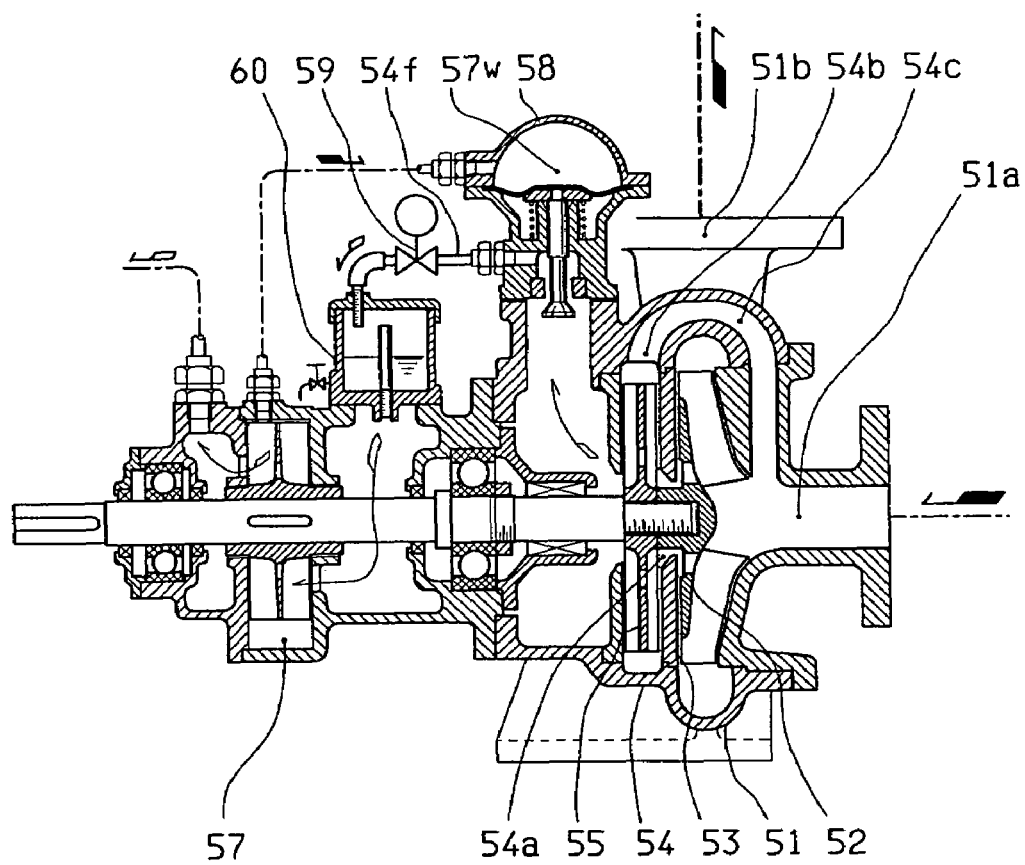
FIG. 16 is a vertical sectional view of an example of the prior art.
Figure 17:
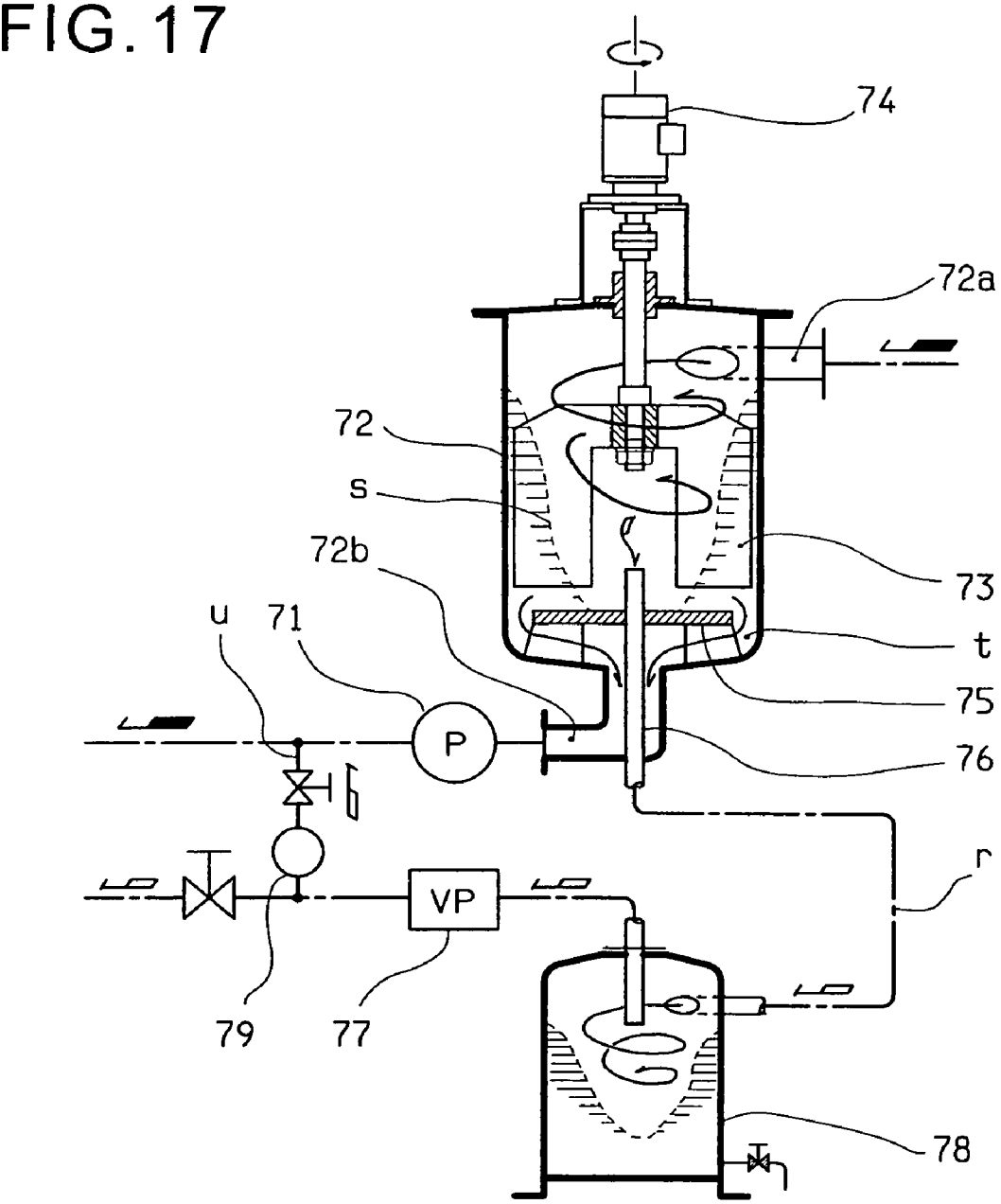
FIG. 17 is a vertical sectional view of an example of the prior art.

The ninth embodiment in FIG. 15 illustrates an example of liquid being pumped to the point of use using the discharge pressure of the gas-liquid separator A itself instead of the booster pump 19 in the system of the eighth embodiment. In this case, discharge flow from the gas-liquid separator A is split by adjusting the throttle of valves 21 and 22 suitably, a part of which returns through the storage tank 15.

The rest of the constitution and functions are the same as those of the eighth embodiment.

Now, technical matters which are common to the respective embodiments will be explained.

The separation position of the casings 1a and 1b may be suitably selected, and do not have to be restricted to the position shown in each illustration. The separation number may be three or more if there is no problem when disassembling and cleaning, and the separation number does not have to be restricted to two.

For the shape of the discharge impeller part 2d of the impeller 2, various shapes of any known type such as non-clog, open, semi-open, and closed types may be applied, and the connecting passage or notch which connect the front and back sides suitably may be provided if the impeller has the shroud, and the vane type may be of a volute type or radial type. In addition, the discharge impeller part 2d function may be substituted by a different type of pump other than the centrifugal pump shown in each embodiment, such as a mixed flow pump, an axial flow pump, a vortex pump, a diaphragm pump, a gear pump or others. Also for the separation impeller part 2s, various shapes of any known type may be applied, and the vane type may be of a volute type or radial type.

The shape of the baffle member 2p may be suitably selected with types such as the plate or block types.

The throttle means 7 may be selected suitably from types such as a fixed type orifice or various valves, and remote operation or auto operation is possible. In addition, breakup means and filtration means for mixed-in foreign material may be installed to the pumped liquid passage of this apparatus.

In each embodiment, the horizontal type rotating shaft 3 is illustrated for convenience of explanation, however, any of horizontal, vertical or inclined types may be selected, as the type of the rotating shaft is not restricted to the horizontal type. As an especially preferable example, the vertical type with the exhaust outlet e on the upper side and the rotating shaft 3 in the vertical direction has the various advantages including uniform gas-liquid separation operation, with less bias to the gas-liquid boundary area due to the influence of gravity; utilization of gas-liquid separation effect due to the spontaneous flotation of gas bubbles; and easy prevention of liquid penetration into exhaust outlet e since it is located on the upper side. CIP (Cleaning In Place) may be performed on this vertical type without problems, as is the case with the horizontal type, by providing the cleaning fluid inlet c and the drain d to suitable locations where the cleaning fluid does not accumulate.

In each embodiment, the shaft sealing 4 and the shaft bearing 5 of the rotating shaft 3 are illustrated on the casing 1b side. However, they can be installed to the casing 1a side, and in this case, the rotating shaft 3 may be designed such that it penetrates the area of the exhaust outlet e.

In addition, the motor which rotates the rotating shaft 3 may be suitably selected according to the use condition. For example, if this apparatus is integrated with a submersible motor using the rotating shaft of the motor as the rotating shaft 3 for this apparatus, the apparatus can be made more compact because the shaft bearing 5 of this apparatus is unnecessary. The waterproofing provision while cleaning is also unnecessary, and placing this apparatus with the motor underwater is possible.

To further improve the gas-liquid separation performance and the pump performance (pump head or discharge amount) of this apparatus, the casing and the impeller may be provided in a multistage structure, and the multiple apparatuses may be connected by piping and operated in series or in parallel. The vacuum means 6 can be various known means and may be one or provided in a plural number, and arbitrary vacuum means may be added.

Furthermore, the respective constituent members of the present invention can have within the intended scope of the present invention, design changes such as changes of numbers, positions and combinations of the constituent members, additional uses of conventional art, etc. Furthermore, material qualities of the constituent members may be suitably selected. Thus, the present invention is not limited to the above-described embodiments.

INDUSTRIAL APPLICABILITY OF THE INVENTION

The present invention provides a gas-liquid separator with enhanced performance and easy operation, having a gas-liquid separation mechanism with a simple structure and stable and assured operation, allowing the application of a powerful vacuum means, and enabling gas-liquid separation functions such as advanced defoaming or degassing operations. It also has sufficient cleanability in any of CIP (Cleaning In Place) or COP (Cleaning Out of Place) that meets sanitary specifications, and a structure corresponding to various kinds of liquids such as food material and chemicals. Its is free from troubles due to pumped liquid penetration into the vacuum means, and is durable. All operations can be performed automatically so that the maintenance is easy. Size reduction or enlargement is easy, and equipment and maintenance costs are very economical. The practical effects of the implementation of the present invention are very high.

What is claimed is:

1. A gas-liquid separator for gas-liquid separation performed by centrifugal force of an impeller mounted on a shaft which rotates in a casing comprising:
   a discharge impeller part providing discharge force to the passing fluid formed on an axial end of the impeller; a discharge outlet of the casing disposed in a position opposite the discharge impeller part;
   the other axial end of the impeller being positioned with clearance from the inner wall of the casing so as to slide on the inner wall of the casing;
   an exhaust outlet of the casing disposed in a position opposite the sliding impeller part; vacuum means connected to the exhaust outlet; and
   a suction inlet of the casing disposed in a position between the discharge outlet and the exhaust outlet.

2. The gas-liquid separator according to claim 1, wherein a cleaning fluid inlet is provided near the shaft sealing of the casing where the rotating shaft penetrates.

3. The gas-liquid separator according to claim 1, wherein the inlet to the casing is formed in a flow path that winds up inside the casing.

4. The gas-liquid separator according to claim 2, wherein the inlet to the casing is formed in a flow path that winds up inside the casing.

5. The gas-liquid separator according to claim 1, wherein the impeller is provided with a baffle member which prevents the direct penetration of liquid near the rotating shaft to the exhaust outlet.

6. The gas-liquid separator according to claim 2, wherein the impeller is provided with a baffle member which prevents the direct penetration of liquid near the rotating shaft to the exhaust outlet.

7. The gas-liquid separator according to claim 1, wherein the impeller is provided with at least one cylindrical member coaxially attached to the impeller.

8. The gas-liquid separator according to claim 2, wherein the impeller is provided with at least one cylindrical member coaxially attached to the impeller.

9. The gas-liquid separator according to claim 1, wherein at least one of fluid throttle means, heating means, and accumulation means is inserted in the passage of the suction inlet.

10. The gas-liquid separator according to claim 2, wherein at least one of fluid throttle means, heating means, and accumulation means is inserted in the passage of the suction inlet.

11. The gas-liquid separator according to claim 7, wherein at least one of fluid throttle means, heating means, and accumulation means is inserted in the passage of the suction inlet.

12. The gas-liquid separator according to claim 1, wherein cavitation causing means is inserted in the passage for gas-liquid separation.

13. The gas-liquid separator according to claim 2, wherein cavitation causing means is inserted in the passage for gas-liquid separation.

14. The gas-liquid separator according to claim 7, wherein cavitation causing means is inserted in the passage for gas-liquid separation.

15. The gas-liquid separator according to claim 1, wherein protection means, which allows gas passage but prevents liquid passage, is inserted in the exhaust passage from the exhaust outlet to the vacuum means.

16. The gas-liquid separator according to claim 2, wherein protection means, which allows gas passage but prevents liquid passage, is inserted in the exhaust passage from the exhaust outlet to the vacuum means.

17. The gas-liquid separator according to claim 7, wherein protection means, which allows gas passage but prevents liquid passage, is inserted in the exhaust passage from the exhaust outlet to the vacuum means.

18. The gas-liquid separator according to claim 1, wherein at least a portion of the discharged fluid from the discharge outlet is returned to the suction inlet.

19. The gas-liquid separator according to claim 2, wherein at least a portion of the discharged fluid from the discharge outlet is returned to the suction inlet.

20. The gas-liquid separator according to claim 7, wherein at least a portion of the discharged fluid from the discharge outlet is returned to the suction inlet.

* * * * *